United States Patent Office 3,215,703
Patented Nov. 2, 1965

3,215,703
CERTAIN BIS-2-THIAZOLIDINETHIONES
Frank A. V. Sullivan, Westfield, and Arthur C. Lindaw, Somerville, N.J., assignors to American Cyanamid Company, Stamford, Conn., a corporation of Maine
No Drawing. Filed Feb. 28, 1962, Ser. No. 176,435
4 Claims. (Cl. 260—306.7)

The present invention is concerned with a new class of compounds useful in forming vulcanized and vulcanizable polychloroprene compositions.

In general, the novel compounds of the invention may be defined as 2-thiazolidinethiones of the structural formula

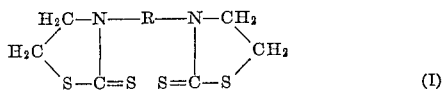
(I)

wherein R may be an alkylene, cyclohexylene or phenylene. Use of these compounds in vulcanizing polychloroprenes forms in part subject matter of our copending application Serial No. 282,856, filed May 24, 1963 as a continuation-in-part.

As used in this discussion, the term "polychloroprene" includes not only polymers of chloroprene (2-chloro-1,3-butadiene) but also copolymers thereof with polymerizable vinyl or diene compounds wherein chloroprene is the predominant monomer. Commercially these polymers and copolymers are available under a variety of type designations, usually grouped as "general-purpose" types or "specialty" types.

General-purpose polychloroprenes or neoprenes also usually are grouped in two classes, the "sulfur-modified" and the "non-sulfur-modified" types. Sulfur-modified neoprenes, such as types GN, GN–A and GRT, require only metallic oxides for vulcanization, since they contain sulfur or such sulfur compounds as thiuram disulfide. In contrast, non-sulfur-modified neoprenes, such as types W and WRT, have a more uniform molecular structure and do not contain sulfur, thiuram disulfide or other compounds capable of decomposing to yield either free sulfur or a vulcanization accelerator. They require not only metallic oxides, but also accelerators to develop proper cures.

Neoprene types W and WRT, for example, are normally formulated with a metallic oxide such as magnesia or zinc oxide. An accelerator still is generally necessary to provide acceptable curing characteristics and vulcanizable properties. Many commercially-available rubber accelerators, such as the thiazoles and the unsubstituted thiazolines, have very little practical value as active accelerators for polychloroprenes such as type W. Others, such as most dithiocarbamates, are too active and have serious scorching tendencies. Among the accelerators useful for other purposes which have been proposed for the purpose include such widely varied materials as:

Diorthotolylguanidine salt of dipyrocatechol borate
Ethylene thiourea
Tetramethylthiurammonosulfide
Salicylic acid
Butyraldehyde-aniline condensate
Butyraldehyde-mono butylamine condensate
Ethyl chloride, formaldehyde, ammonia reaction product
Diphenylguanidine plus sulfur In general, they either do not provide the desired vulcanizate or they are too scorchy. The most generally useful and perhaps most effective has been found to be 2-mercaptoimidazoline (ethylene thiourea). However, it too has not proved wholly satisfactory, its scorch tendencies being too high.

Surprisingly, compounds of this invention are found excellent as accelerators for polychloroprenes. They give safe processing of neoprene types W and WRT. They have a markedly delayed action and therefore do not cause premature vulcanization or scorching. Physical properties of resultant vulcanizates are comparable to those obtained by the use of ethylene thiourea. The scorching time is considerably extended over that provided by ethylene thiourea.

Accelerators of this invention may be prepared by several different general procedures. In the first, carbon disulfide is reacted directly with an N-substituted beta-aminoethanol, presumably according to the reaction

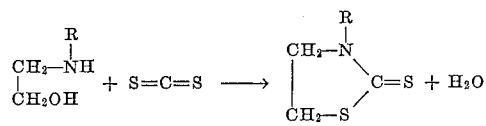

In the second method, a modification of the first, carbon disulfide is first reacted with aqueous potassium hydroxide and ethanol, and the resulting xanthate is reacted with an N-substituted beta-aminoethanol, presumably according to the reaction

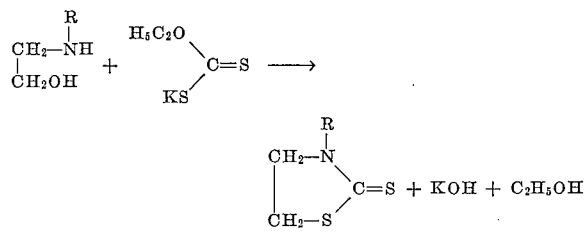

In a third method, ethylene dibromide is reacted with a diaryl thiourea and the resulting 3-aryl-2-aryliminothiazolidine is then reacted with carbon disulfide.

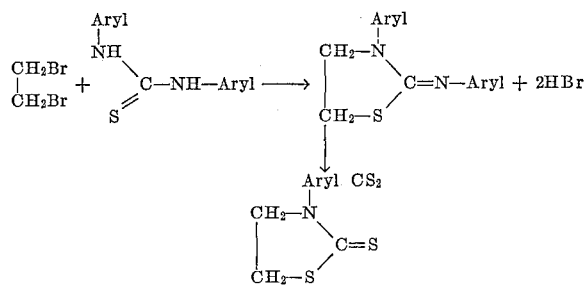

In accordance with these methods, the following 3-substituted 2-thiazolidinethiones may be prepared and used in the practice of the present invention:

3-methyl-2-thiazolidinethione
3-ethyl-2-thiazolidinethione[1]
3-(beta-hydroxyethyl)-2-thiazolidinethione[1]
3-(beta-methoxyethyl)-2-thiazolidinethione[1]
3-n-butyl-2-thiazolidinethione
3-isobutyl-2-thiazolidinethione[1]
3-cyclohexyl-2-thiazolidinethione[1]
3-benzyl-2-thiazolidinethione
3-(p-methylbenzyl)-2-thiazolidinethione[1]
3-(p-methoxybenzyl)-2-thiazolidinethione[1]
3-(p-chlorobenzyl)-2-thiazolidinethione
3-(1-naphthylmethyl)-2-thiazolidinethione[1]
3-(beta-phenylethyl)-2-thiazolidinethione[1]
3-(2-furfuryl)-2-thiazolidinethione[1]
3-morpholinomethyl-2-thiazolidinethione
3-phenyl-2-thiazolidinethione
3-o-tolyl-2-thiazolidinethione
3-p-tolyl-2-thiazolidinethione
3-(o-methoxyphenyl)-2-thiazolidinethione
3-(p-methoxyphenyl)-2-thiazolidinethione 3-(p-ethoxyphenyl)-2-thiazolidinethione
3-(p-chlorophenyl)-2-thiazolidinethione
3-alpha-naphthyl-2-thiazolidinethione
3,3'-methylene-bis(2-thiazolidinethione)[1]
3,3'-propylene-bis(2-thiazolidinethione)[1]
3,3'-butylene-bis(2-thiazolidinethione)[1]
3,3'-ethylene-bis(2-thiazolidinethione)[1]
1,4-cyclohexylene-bis(2-thiazolidinethione)[1]
1,4-phenylene-bis(2-thiazolidinethione)[1]

[1] These are new compounds.

In practice, the amount of accelerator which may be used with the chloroprene polymer stock may be varied within wide limits, according to the result desired. In general, from about 0.1% to about 1.5% of the accelerator based on the weight of the chloroprene polymer is employed. It is preferred to use from about 0.25% to about 0.65% of the accelerator based on the weight of the chloroprene polymer present in the stock to be vulcanized and in general this will be found to be good practice.

Accelerators of this invention may and will be used in conjunction with conventional compounding ingredients used in the preparation of polychloroprene vulcanizates. Typical examples of such ingredients include antioxidants, metallic oxides, colors, softeners and peptizers, fillers and extenders, reinforcing materials and carbon blacks, and fatty acids and lubricants.

Typical polychloroprenes, such as types W and WRT, usually are compounded by milling together the ingredients. For maximum activitiy of the 3-substituted 2-thiazolidinethiones, it is necessary that the order of addition of the ingredients be that shown in the examples.

The invention will be further described in conjunction with the following illustrative examples. Therein all parts and percentages are by weight unless otherwise noted and all temperatures are in degrees centigrade.

To illustrate the preparation of the compounds of this invention, the following several examples of the preparation of new compounds are given.

EXAMPLE 1

*3-(p-methylbenzyl)-2-thiazolidinethione*

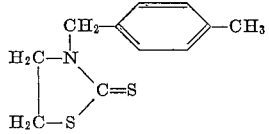

Add 30.7 parts of 2-(p-methylbenzylamino)ethanol to 31.5 parts of carbon disulfide with external cooling. The resulting mixture is heated in an autoclave at 140° C. for 4 hours. The colorless, crystalline product obtained by crystallization of the crude product from alcohol melts at about 113° C.

*Analysis.*—Calcd. for $C_{11}H_{13}NS_2$: C, 59.3; H, 5.83; N, 6.28; S, 28.7. Found: C, 59.3; H, 5.56; N, 6.34; S, 29.0.

EXAMPLE 2

*3-(p-methoxybenzyl)-2-thiazolidinethione*

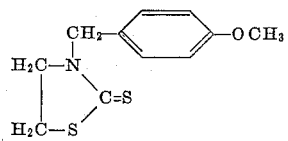

Add 42 parts of 2-(p-methoxybenzylamino)ethanol to 44.2 parts of carbon disulfide with external cooling. The resulting mixture is heated in an autoclave at 140° C. for 5 hours. The colorless crystalline product obtained by crystallization of the crude product from alcohol melts at about 104° C.

Calcd. for $C_{11}H_{13}NOS_2$: C, 55.2; H, 5.44; N, 5.86; S, 26.8.
Found: C, 55.3; H, 5.36; N, 5.80; S, 27.1.

EXAMPLE 3

*3-ethyl-2-thiazolidinethione*

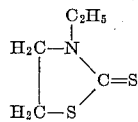

To a solution of 20.3 parts of potassium hydroxide in 133 parts of anhydrous ethyl alcohol, add with stirring 81.5 parts of carbon disulfide. To the resulting yellow slurry, add with stirring and cooling, 89 parts of 2-(ethylamino)ethanol. The resulting mixture is then refluxed for about 16 hours. After removing the solvents by distillation from a steam bath, the insoluble material is removed by filtration. The crude oily product (filtrate) is fractionated by distilling in vacuo, and the portion boiling at approximately 135–136° C. at 1 mm. pressure is collected. The product is a light yellow, viscous oil.

*Analysis.*—Calcd. for $C_5H_9NS_2$: C, 40.8; H, 6.1; N, 9.5; S, 43.5. Found: C, 41.0; H, 6.18; N, 9.38; S, 43.6.

EXAMPLE 4

*3-(beta-hydroxyethyl)-2-thiazolidinethione*

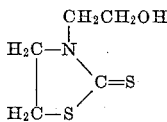

A mixture of 210 parts of diethanolamine and 304 parts of carbon disulfide is heated in an autoclave at 140° C. for 4 hours. After extracting the product twice with 250 parts of water, the residue is purified by a vacuum distillation. The product, boiling at 213–219° C. at a pressure of 7 mm. of mercury, is a light yellow oil.

*Analysis.*—Calcd. for $C_5H_9NOS_2$: C, 36.9; H, 5.5; N, 8.6; S, 39.2. Found: C, 36.4; H, 5.68; N, 8.44; S, 40.7.

EXAMPLE 5

*3-(beta-methoxyethyl)-2-thiazolidinethione*

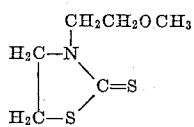

A mixture of 21.4 parts of 2-(beta-methoxyethylamino)ethanol and 21.7 parts of carbon disulfide is heated in an autoclave at 140° C. for 4 hours. The reaction mixture is distilled in vacuo. The product is a yellow oil boiling at about 173–175° C. under a pressure of 3.5 mm. of mercury.

*Analysis.*—Calcd. for $C_6H_{11}NOS_2$: C, 40.7; H, 6.2; N, 7.9; S, 36.1. Found: C, 41.9; H, 6.1; N, 8.14; S, 30.1.

The intermediate, 2-(beta-methoxyethylamino)ethanol is prepared by reacting the p-toluenesulfonyl ester of beta-methoxyethanol with monoethanolamine in the presence of sodium hydroxide at 130° C. The compound boils at 99–103° C. under a pressure of 10 mm. of mercury.

EXAMPLE 6

*3-cyclohexyl-2-thiazolidinethione*

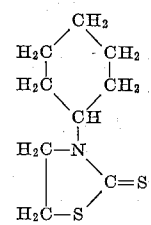

A mixture of 71.5 parts of 2-(cyclohexylamino)ethanol and 76 parts of carbon disulfide are heated in an autoclave at 138–140° C. for 4 hours. After crystallization from ethanol, the colorless crystalline product melts at 120–120.5° C.

*Analysis.*—Calcd. for $C_9H_{12}NS_2$: C, 53.8; H, 7.4; N, 6.9; S, 31.9. Found: C, 54.1; H, 7.6; N, 7.1; S, 32.4.

EXAMPLE 7

*3-(beta-phenylethyl)-2-thiazolidinethione*

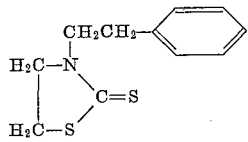

With external cooling, 38 parts of carbon disulfide is added gradually to 41.2 parts of 2-(beta-phenylethylamine)ethanol. A mixture of 24 parts of the white, crystalline product (M.P. 113–114° C.) and 38 parts carbon disulfide is heated in an autoclave at 140° C. for 4 hours. After removal of the excess carbon disulfide by distillation, the residue is purified by crystallization from alcohol. The product, a pale yellow, crystalline material, melts at 73.5–74° C.

*Analysis.*—Calcd. for $C_{11}H_{13}NS_2$: C, 59.1; H, 5.9; N, 6.3; S. 28.7. Found: C, 59.2; H, 5.64; N, 6.47; S, 29.6.

EXAMPLE 8

*3-(1-naphthylmethyl)-2-thiazolidinethione*

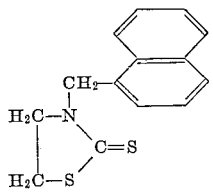

A mixture of 57 parts of carbon disulfide and 41.7 parts of 2-(1-naphthylmethylamino)ethanol is heated in an autoclave at 120° C. for 3 hours. After crystallization from alcohol, the product consists of colorless crystals melting at 121.5–122° C.

*Analysis.*—Calcd. for $C_{14}H_{13}NS_2$: C, 64.8; H, 5.02; N, 5.40; S, 24.7. Found: C, 65.0; H, 4.09; N, 5.53; S, 24.8.

EXAMPLE 9

*3-(2-furfuryl)-2-thiazolidinethione*

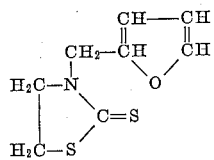

A mixture of 38 parts of carbon disulfide and 31.8 parts of 2-(2-furfurylamino)ethanol is heated in an autoclave for 2 hours at 120° C. The product, after crystallizing from ethanol, consists of colorless crystals melting at 69–70° C.

*Analysis.*—Calcd. for $C_8H_9NOS_2$: C, 48.2; H, 4.52; N, 7.04; S, 32.2. Found: C, 48.0; H, 4.58; N, 6.84; S, 32.7.

EXAMPLE 10

*3,3'-ethylenebis(2-thiazolidinethione)*

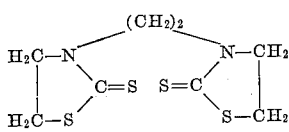

A mixture of 148 parts of N,N'-bis(beta-hydroxyethyl) ethylenediamine and 304 parts carbon disulfide is heated in an autoclave at 140° C. for 4 hours. After cooling, the viscous lower layer is separated and is mixed with 800 parts of acetone. The resulting crystalline product is filtered off. After recrystallization from o-dichlorobenzene, the product consists of cream-colored needles melting at 253–254° C.

*Analysis.*—Calcd. for $C_8H_{12}N_2S_4$: C, 36.4; H, 4.50; N, 10.6; S, 48.5. Found: C, 36.8; H, 4.28; N, 10.0; S, 48.5.

EXAMPLE 11

*3-isobutyl-2-thiazolidinethione*

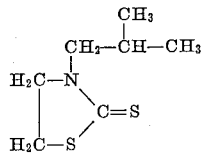

While cooling, add 45.6 parts of carbon disulfide to 35.0 parts of 2-(isobutylamino)ethanol. The resulting mixture is heated in an autoclave at 120° C. for 3 hours. The crude oily reaction product is stirred with 200 parts of water. The water-insoluble oil is then extracted with ether, and the ether is removed by distillation. By distilling the residue in vacuo, a yellow oil boiling at 178–185° C. at 6–7 mm. of mercury pressure is obtained.

*Analysis.*—Calcd. for $C_7H_{13}NS_2$: C, 48.0; H, 7.40; N, 8.00. Found: C, 47.5; H, 7.56; N, 7.80.

For purposes of comparison, in addition to the new compounds shown in Examples 1–11, the derivatives of 2-thiazolidinethione shown in Table I were prepared. These compounds have been previously reported in the chemical literature, and in Table I the melting points found are compared with the melting points given in the references.

TABLE I

| Derivative of 2-Thiazolidine-thione | Reference | Melting Point, ° C. | |
|---|---|---|---|
| | | Found | Cited |
| 3-Benzyl | J. Am. Chem. Soc. 78, 189 | 132–133 | 132.5–133 |
| 3-(p-Chlorobenzyl) | J. Am. Chem. Soc. 78, 191 | 124–126 | 125–126 |
| 3-Methyl | J. Chem. Soc. 1949, 786 | 69–70 | 68–69 |
| 3-n-Butyl | J. Chem. Soc. 1948, 786 | (an oil) | (an oil) |
| 3-Phenyl | Ber. 15, 345 | 131–132 | 134 |
| 3-p-Tolyl | Ber. 15, 1314 | 105 | 105 |

EXAMPLE 12

In the following illustrative examples of the use of the compounds of this invention, a master batch of polychloroprene (type W) is prepared by placing 600 parts of neoprene W on a two roller mill at 50° C. Thereto in the following order is added 12 parts of phenyl-β-naphthylamine
12 parts of light-calcined MgO
30 parts of zinc oxide
174 parts of reinforcing black
3 parts of stearic acid and milling is carried out for about fifteen minutes. As noted above, care must be exercised in compounding polymers of this type that the several ingredients are added in the order shown above. If this is not done the desired product properties are not obtained. This master batch is used in the following examples.

EXAMPLE 13

Two samples, each of 400 parts of the master batch of Example 12 are separately placed on a 2-roller mill, the front and back rolls having temperatures of 45° and 75° C., respectively. To the first is added 1.45 parts of 3-benzyl-2-thiazolidinethione over 0.5 minute. To the second an equal amount of 2-mercaptoimidazoline (ethylene thiourea) is added as the accelerator, replacing the 3-benzyl-2-thiazolidinethione. The samples are milled for 23 minutes, conditioned at 73° C. and 61% relative humidity for about 18 hours and then cured at 153° C. for 20 minutes. Both resultant vulcanized rubbers are then subjected to various standard tests to determine their comparative physical characteristics.

The scorch point is determined as the time in minutes at which the viscosity of the unvulcanized rubber reached a value of 5 Mooney units above the minimum, as measured on a Mooney viscometer by ASTM Designation D1077–55T, at a temperature of 250° F.

The tensile properties of the vulcanized rubber, namely modulus or stress, percent elongation and stress relaxation or tension set, are measured by the procedures of ASTM Designation D412–51T. The stress relaxation is the increase in length expressed as percent of the original length when rubber is stretched and released.

The compression set of the vulcanized rubber is measured by the procedure of ASTM Designation D395–53T using a 30% compression for five hours at 100° C. Compression set is the amount (percent) by which a standard test piece fails to return to its original thickness after being subjected to a standard compressive load for a fixed period of time.

The results of the tests are shown in Table II as the average of two runs for each accelerator.

TABLE II

|  | 2-Mercapto-imidazoline | 3-Benzyl-2-thiazolidine-thione |
| --- | --- | --- |
| Scorch, minutes | 10 | 26 |
| 300% Modulus (p.s.i.) | 1,450 | 1,365 |
| Compression Set (percent) | 41.8 | 41.9 |
| Stress Relaxation (percent): |  |  |
| 75% Elongation | 26.1 | 20.5 |
| 100% Elongation | 26.1 | 22.1 |
| Tensile Strength at Break (p.s.i.) | 3,100 | 3,160 |
| Elongation at Break (percent) | 505 | 515 |

As shown in Table II, polychloroprene compounded with 3-benzyl-2-thiazolidinethione is superior in scorch resistance and stress relaxation and is equal in tensile modulus and compression set properties to that compounded with the commercially-available 2-mercaptoimidazoline previously considered as the best available agent.

EXAMPLE 14

The procedure of Example 13 is followed substituting equal amounts of other 3-substituted s-thiazolidinethiones for the 3-benzyl-2-thiazolidinethione. Illustrative results are shown in Table III. As may be seen therefrom, the 2-thiazolidinethiones of this invention are much superior to 2-mercaptoimidazoline in scorch resistance.

TABLE III

| Derivative of 2-Thiazolidinethione | Scorch, Min. | 200% Modulus, p.s.i. | 300% Modulus, p.s.i. | Elongation at Break, p.s.i. | Tensile Strength at Break, p.s.i. | Stress Relaxation 75% Elong., Percent | Compression Set, Percent |
| --- | --- | --- | --- | --- | --- | --- | --- |
| 3-Methyl | 16 | 800 | 1,650 | 440 | 2,900 | 11.1 | 27.1 |
| 3-Ethyl | 16 | 725 | 1,525 | 510 | 3,275 | 21.7 | 30.0 |
| 3-Phenyl | 24 | 700 | 1,475 | 500 | 3,125 | 25.3 | 34.5 |
| 3-Cyclohexyl | 22 | 675 | 1,400 | 520 | 3,250 | 23.6 | 40.3 |
| 3-p-Chlorophenyl | 26 | 500 | 1,150 | 570 | 3,250 | 29.3 | 40.6 |
| 3-p-Methoxybenzyl | 25 | 600 | 1,300 | 520 | 3,100 | 25.4 |  |
| 3,3'-Ethylenebis | 26 | 650 | 1,375 | 500 | 3,050 |  |  |
| 2-Mercaptoimidazoline | 8 | 625 | 1,350 | 550 | 3,325 | 23.8 | 32.5 |

Preparation of a master batch comprising the polychloroprene and the conventional compounding ingredients is shown above in Example 12. Therein it was noted that the ingredients were added in a specifically designated order. To obtain the delayed action accelerator effect with the vulcanization assistants of the present invention, it is necessary that the magnesium oxide, the zinc oxide and the carbon black be added in that order. If an antioxidant such as the amine is used, it should be the first added. Addition of stearic acid or other fatty acid to improve distribution of the carbon black should follow the latter. The following examples illustrate this point.

EXAMPLE 15

Preparation of batches as in Example 12 is repeated a number of times, on a two roller mill at about 50° C., adding to 600 parts of polychloroprene (type W), the same conventional compounding ingredients, identified as follows, but varying the order of addition.

(A) 12 parts of phenyl-beta-naphthylamine
(B) 12 parts of light-calcined magnesium oxide
(C) 30 parts of zinc oxide
(D) 174 parts of reinforcing black
(E) 3 parts of stearic acid.

Thereafter, with the front roll at about 45° C. and the back roll at about 75° C., to 400 part samples of the so-prepared batches over about 0.5 minute is added 1.45 parts of 3-benzyl-2-thiazolidinethione and the mix is milled for 23 minutes. It is then conditioned at 73° C. and about 60% relative humidity for about 18 hours and then cured at 153° C. for twenty minutes. The effect of varying the order of addition on the scorch time and modulus is illustrated in the following table.

TABLE IV

| Order of Addition | | | | | Scorch (mins.) | Modulus at 300% (p.s.i.) |
| --- | --- | --- | --- | --- | --- | --- |
| 1 | 2 | 3 | 4 | 5 | | |
| E | A | B | C | D | 42 | 775 |
| E | B | C | D | A | 36 | 775 |
| B | C | D | E | A | 33 | 880 |
| C | D | B | A | E | <1 | ------ |
| E | C | D | B | A | 5 | 1,125 |
| E | A | C | D | B | 5 | 1,050 |
| E | A | B | D | C | 39 | 1,200 |
| E | B | D | C | A | 44 | ------ |
| B | D | C | E | A | 52 | 1,150 |
| D | C | B | A | E | <1 | ------ |
| E | D | C | B | A | <1 | 1,050 |
| E | A | D | C | B | <1 | ------ |

EXAMPLE 16

Repeating Example 15, substituting 3-methyl-2-thiazolidinethione for the 3-benzyl- compound showed the same effect of varying the order of addition.

EXAMPLE 17

Repeating Example 15, using as the accelerator the 2-mercaptoimidazoline used for comparative purposes in Example 12 as the accelerator showed no substantial effect on the vulcanized product was produced by changing the order of addition.

The reasons for this effect of the order of addition of conventional compounding ingredients before adding the accelerator of this invention are not wholly understood. It is highly surprising. Nevertheless, it is a precaution that must be observed to obtain optimum results.

We claim:
1. A compound of the formula

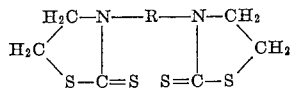

wherein R is selected from the group consisting of alkylene of 1-4 carbons, phenylene and cyclohexylene.
2. 3,3'-ethylene-bis(2-thiazolidinethione).
3. 3,3'-cyclohexylene-bis(2-thiazolidinethione).
4. 3,3'-phenylene-bis(2-thiazolidinethione).

References Cited by the Examiner
UNITED STATES PATENTS

| | | | |
|---|---|---|---|
| 2,726,221 | 12/55 | Semegen et al. | 260—23.7 |
| 2,766,223 | 10/56 | Goshorn et al. | 260—79.5 |
| 2,784,196 | 3/57 | Bacchetti | 260—306.7 |
| 2,911,419 | 11/59 | Hughes | 260—306.7 |

NICHOLAS S. RIZZO, *Primary Examiner.*

LEON J. BERCOVITZ, *Examiner.*